No. 608,345. Patented Aug. 2, 1898.
C. E. RETTEW & W. R. JOHNSON.
REDUCING VALVE.
(Application filed July 7, 1897.)
(No Model.)
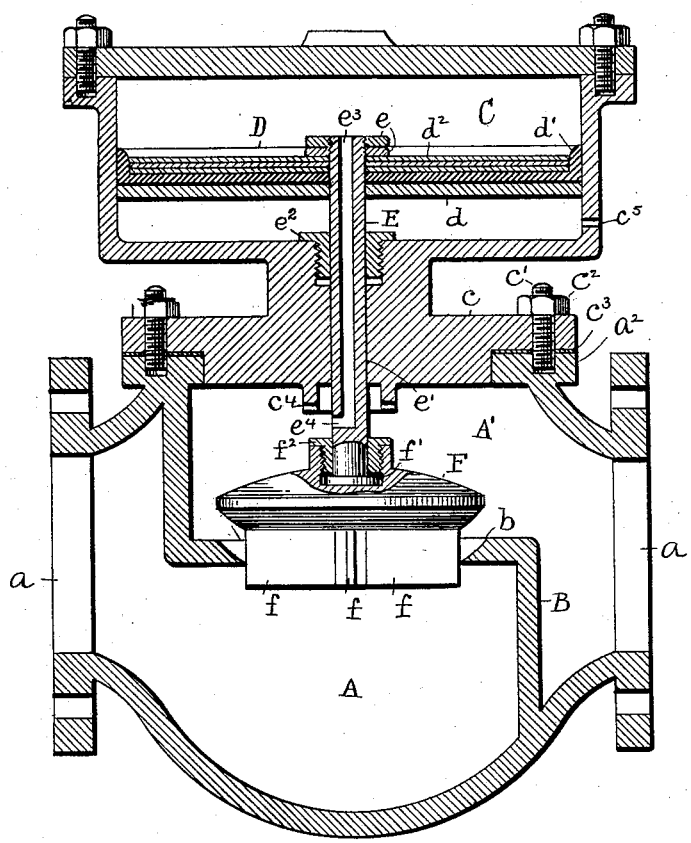
WITNESSES:
Norris A. Clark.
Jno. R. Taylor.
INVENTORS:
Charles E. Rettew
William R. Johnson
BY
Dyer & Driscoll
his ATTORNEYS.
THE NORRIS PETERS CO., PHOTO-LITHO., WASHINGTON, D. C.

UNITED STATES PATENT OFFICE.

CHARLES E. RETTEW AND WILLIAM R. JOHNSON, OF CARBONDALE, PENNSYLVANIA.

REDUCING-VALVE.

SPECIFICATION forming part of Letters Patent No. 608,345, dated August 2, 1898.

Application filed July 7, 1897. Serial No. 643,783. (No model.)

*To all whom it may concern:*

Be it known that we, CHARLES E. RETTEW and WILLIAM R. JOHNSON, citizens of the United States, residing at Carbondale, in the county of Lackawanna and State of Pennsylvania, have invented a certain new and useful Improvement in Automatic Reducing-Valves, of which the following is a specification.

The object of the present invention is to provide a simple, cheap, and durable valve for reducing the pressure of a fluid agent to a set pressure of any desired degree.

A further object is to reduce the pressure automatically and without excessive shock or jar which would tend to injuriously affect connected pipes, &c.

In carrying out our invention we employ a valve having inlet and outlet orifices and a valve and valve-seat, said valve being operable by means of a valve-stem, to which is connected a piston. The piston-chamber and the space about the valve are connected by means of a port extending through the valve-stem, whereby excess pressure at the latter point is communicated to the piston-chamber, where it operates to close the valve.

The invention is illustrated in the accompanying drawing, which is a vertical section, partly in elevation, of a valve mechanism embodying our improvements.

Referring to the drawing, A designates the valve-chamber, having inlet-orifice $a$ and outlet-orifice $a'$. The latter may be of any desired construction to facilitate connection of pipes. They may be provided with outwardly-extending perforate flanges, as shown in the drawing, or with internal or external screw-threads. This valve-chamber may be of any desired size and the casing formed of any suitable material.

The valve-chamber A is interiorly divided by the partition B, here shown as angular in form and provided with the valve-seat $b$.

C designates the piston-chamber. This is cylindrical in form and is provided with a flat outwardly-extending base $c$, by means of which it may be secured to the valve-chamber $a$. In the present instance we have shown the upper portion of the valve-chamber A as provided with a horizontal flange or annulus $a^2$, the base $c$ of the piston-chamber being connected to such flange or annulus $a^2$ by means of bolts and nuts $c'$ $c^2$. Between the meeting surfaces of the parts $a^2$ and $c$ we preferably place an elastic washer $c^3$. If desired, however, the securing mechanism described may be dispensed with, the valve-chamber being provided with screw-threads adapted to engage with corresponding threads upon the base $c$ of the piston-chamber C. D designates a piston having vertical movement in the piston-chamber C. This piston is here shown as consisting of a preferably metallic disk $d$, a washer or bushing $d'$ of leather, rubber, or other suitable material, and a disk or disks $d^2$ above said washer or bushing.

Secured, preferably by means of nuts $e$, to the piston D is the valve-stem E. This passes through a perforation $e'$, extending from the piston-chamber C into the upper portion A' of the valve-chamber A.

$e^2$ designates a packing-box, here shown as provided with external screw-threads engaging with corresponding threads in an annular recess formed in the casing of the valve-chamber and communicating with the chamber C, but which may be of any desired construction. Its purpose is to prevent the ingress of water or other fluid agent from the valve-chamber to the piston-chamber outside of the valve-stem E.

The valve-stem E is tubular in form, being provided with a central perforation $e^3$, one end of which communicates with the interior of the piston-chamber C above the piston D, and the other end by means of a transverse port $e^4$ with the upper portion A' of the valve-chamber A.

Secured to the lower end of the valve-stem E and coacting with the valve-seat $b$, formed in the partition B, is the valve F. In the present instance this valve is shown as consisting of a circular body the under surface of which is beveled or curved in correspondence with the curvature of the valve-seat $b$. Below such curved portion the valve is provided with wings or vanes $f$ at right angles to each other, the purpose of which is to center the valve in the valve-seat and maintain it in this position against accidental displacement. Such wings or vanes do not of course obstruct the passage of the fluid agent from the lower to the upper portions of the valve-chamber when the valve is opened.

As to the means for securing the valve-stem E to the valve F, these are herein shown as consisting of a flange $f'$, formed at the lower end of the valve-stem and received in a suitable circular recess in the top of said valve. Surrounding the lower end of the valve-stem and above the flange $f'$ is a collar-nut $f^2$, the exterior of which is screw-threaded, and this portion engages with the correspondingly-threaded interior of the recess which receives the lower end of the valve-stem.

$c^4$ designates an annular projection formed on the under side of the base $c$ of the piston-chamber, the purpose of which is to limit the upward movement of the valve F.

The operation of our improved valve is as follows: Assuming that the fluid agent employed is water, this enters at high pressure by the inlet-orifice $a$, passes through the perforation in the partition B, and thence out through the outlet-orifice $a'$. To reduce this pressure, the valve F is operated to prevent this circulation of the water, and this is done in the following manner: Assuming that it is desired to reduce the pressure at the outlet-orifice, a portion of the water passing through the valve will be forced through the port $e^4$ and passage $e^3$ to the piston-chamber C above the piston D. When the passage of the water through the outlet connection is cut off, the pressure above the piston D becomes sufficiently great to move said piston downwardly, and thereby, through the connections above described, close the valve F, whereby the pressure of the water escaping through said outlet-orifice $a'$ and its connection will be reduced to the desired extent. Of course the degree of reduction of the pressure depends wholly upon the dimensions of the valve-chamber C, and, if desired, these may be varied to any desired extent.

We have found it desirable in practice to provide the casing of the valve-chamber C below the piston D with an exhaust-port $c^5$ for the escape of any water or other agent finding its way into the valve-chamber below the piston D.

What we claim, and desire to secure by Letters Patent, is—

1. In a reducing-valve, the combination with a valve-chamber having inlet and outlet orifices and a valve-seat in said chamber between said orifices, of a cylinder removably secured to said valve-casing, a piston in said cylinder, a valve of smaller area than the piston, connected to said piston and engaging the valve-seat, the pressure on the inlet side tending to normally unseat the said valve, the valve-stem having a contracted passage through the same connecting the outlet side of the valve-chamber and the interior of said cylinder above the piston, whereby the pressure on the outlet side tends to seat the valve, substantially as set forth.

2. In a reducing-valve, the combination with a valve-chamber having inlet and outlet orifices and a valve-seat between said orifices, of a cylinder removably secured to said valve-chamber, a piston in said cylinder, a valve-stem connected to said piston, a valve connected to said valve-stem and engaging said valve-seat, the valve-stem having a passage-way $e^4$ therein extending from the outlet side of the valve-chamber to the interior of said cylinder above the piston, and stops $c^4$ for limiting the upward movement of the valve, substantially as set forth.

This specification signed and witnessed this 5th day of July, 1897.

CHARLES E. RETTEW.
    WILLIAM R. JOHNSON.

Witnesses:
 HARRY WRIGHT,
 F. C. TIMMONS.